US007671891B2

(12) United States Patent
Fitzgibbon et al.

(10) Patent No.: US 7,671,891 B2
(45) Date of Patent: Mar. 2, 2010

(54) ONLINE CAMERA CALIBRATION

(75) Inventors: Andrew Fitzgibbon, Cambridge (GB);
Antonio Criminisi, Cambridge (GB);
Srikumar Ramalingam, Oxford (GB)

(73) Assignee: Microsoft Corporation, Redmond, WA (US)

( * ) Notice: Subject to any disclaimer, the term of this patent is extended or adjusted under 35 U.S.C. 154(b) by 343 days.

(21) Appl. No.: 11/751,932

(22) Filed: May 22, 2007

(65) Prior Publication Data

US 2008/0291282 A1    Nov. 27, 2008

(51) Int. Cl.
*H04N 17/00*    (2006.01)
(52) U.S. Cl. ..................................... 348/188
(58) Field of Classification Search ................ 348/175, 348/176, 187, 188, 222.1
See application file for complete search history.

(56) References Cited

U.S. PATENT DOCUMENTS

| | | | | |
|---|---|---|---|---|
| 5,179,441 | A | * | 1/1993 | Anderson et al. ............. 348/43 |
| 5,818,977 | A | * | 10/1998 | Tansley ....................... 382/294 |
| 6,606,406 | B1 | * | 8/2003 | Zhang et al. ................. 382/154 |
| 7,199,817 | B2 | | 4/2007 | Mottur et al. |
| 7,450,735 | B1 | * | 11/2008 | Shah et al. ................... 348/143 |
| 2005/0261849 | A1 | * | 11/2005 | Kochi et al. ................... 702/85 |
| 2006/0204104 | A1 | * | 9/2006 | Liu et al. ..................... 382/194 |
| 2006/0245617 | A1 | * | 11/2006 | Shan et al. ................... 382/103 |
| 2007/0129906 | A1 | * | 6/2007 | Stoecker et al. ............. 702/108 |
| 2008/0309777 | A1 | * | 12/2008 | Aoyama ................... 348/222.1 |

FOREIGN PATENT DOCUMENTS

| | | |
|---|---|---|
| JP | 2001245326 A | 9/2001 |
| JP | 2003299005 A | 10/2003 |
| KR | 20000072269 A | 12/2000 |
| KR | 20040053877 A | 6/2004 |

OTHER PUBLICATIONS

Schafer, et al., "A Shrinkage Approach to Large-Scale Covariance Matrix Estimation and Implications for Functional Genomics", Statistical Applications in Genetics and Molecular Biology, vol. 4, No. 1, 2005, pp. 32.
Chandraker, "Two-View Focal Length Estimation for All Camera Motions Using Priors", Dept. of Computer Science & Engineering, University of California, San Diego, CA, Dec. (2004) 8 pages.

(Continued)

*Primary Examiner*—Jason Whipkey
(74) *Attorney, Agent, or Firm*—Lee & Hayes, PLLC

(57) ABSTRACT

Online camera calibration methods have been proposed whereby calibration information is extracted from the images that the system captures during normal operation and is used to continually update system parameters. However, such existing methods do not cope well with structure-poor scenes having little texture and/or 3D structure such as in a home or office environment. By considering camera families (a set of cameras that are manufactured at least partially in a common manner) it is possible to provide calibration methods which are suitable for use with structure-poor scenes. A prior distribution of camera parameters for a family of cameras is estimated and used to obtain accurate calibration results for individual cameras of the camera family even where the calibration is carried out online, in an environment which is structure-poor.

17 Claims, 5 Drawing Sheets

OTHER PUBLICATIONS

Frahm, et al "Robust Camera Calibration from Images and Rotation Data", In Proceedings of DAGM (2003), 8 pages.

Hartley, et al., "Multiple View Geometry in Comuter Vision - Second Edition", Cambridge University Press, Mar. 2004, 4 pages.

Gruber, et al., "Incorporating Constraints and Prior Knowledge into Factorization Algorithms - an Application to 3D Recovery", Hebrew University of Jerusalem, 2005, 12 pages.

Sundareswara, et al., "Bayesian Modelling of Camera Calibration and Reconstruction", IEEE, 5th International Conference on 3-D Digital Imaging and Modeling, Jun. 13-16, 2005, 8 pages.

Triggs, et al "Bundle Adjustment - A Modern Synthesis", Vision Algorithms: Theory & Practice, LNCS, 2003, 71 pages.

* cited by examiner

ONLINE CAMERA CALIBRATION

BACKGROUND

Cameras are used to capture images of scenes and in order to make use of the captured images, for example, to navigate a robotic vehicle, to pick up items in a robotic manufacturing system or to estimate distances of objects from a stereo web camera, it is often necessary to have calibration information for the camera being used. For example, this camera calibration information, for a mono-camera, may be a set of five parameters, one for the focal length of the camera, one for the pixel aspect ratio, two for the image coordinates of the principal point, and one parameter describing nonlinear lens distortion.

It is known to calibrate a camera in a laboratory environment by presenting a known target or motion sequence to the camera. However, this is time consuming and expensive. Also, re-calibration is typically necessary because even camera systems which have been constructed to tight tolerances from high-quality components eventually change their characteristics. For example, this might be due to changes in temperature, dropping or jolting the camera, or changes in humidity. In order to re-calibrate the camera an explicit calibration procedure in a laboratory environment can be repeated but this is expensive and time consuming as mentioned above. Also, this type of calibration process is not suitable for systems such as autonomous robots, which must work in unconstrained environments, or for mass-market consumer applications.

Online camera calibration methods have been proposed whereby calibration information is extracted from the images that the system captures during normal operation and is used to continually update system parameters. However, existing online camera calibration methods do not cope well with structure-poor scenes; that is, where the images that the system captures during normal operation comprise little texture and/or 3D structure. Where cameras are used in the home or office environment it is often the case that images captured in normal operation are structure-poor and/or comprise features which hinder online calibration.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Online camera calibration methods have been proposed whereby calibration information is extracted from the images that the system captures during normal operation and is used to continually update system parameters. However, such existing methods do not cope well with structure-poor scenes having little texture and/or 3D structure such as in a home or office environment. By considering camera families (a set of cameras that are manufactured at least partially in a common manner) it is possible to provide calibration methods which are suitable for use with structure-poor scenes. A prior distribution of camera parameters for a family of cameras is estimated and used to obtain accurate calibration results for individual cameras of the camera family even where the calibration is carried out online, in an environment which is structure-poor Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As mentioned above, existing online calibration methods are best suited to scenes with rich 3D structure and with plentiful texture for matching (in the case of stereo camera systems). However, such scenes are often unavailable, especially in the home or office environment. In these situations there are often a number of challenges to online calibration, such as repeated structure, specular reflections, large areas of no texture, and often a lack of depth relief. In many cases, images captured for online calibration not only lack rich structure, but also include clusters of outlier data which conspire to increase the likelihood of incorrect solutions (e.g. wallpaper with a repeating pattern or Venetian blinds).

By considering camera families it is possible to provide online calibration methods which are suitable for use with structure-poor scenes. The term "camera family" is used to refer to a set of cameras which are manufactured at least partially in a common manner. For example, a camera family may be all cameras of the same model made by a particular manufacturer at a particular manufacturing plant. Another example of a camera family is the set of cameras made by the same manufacturer. Another example might be the set of cameras made using the same manufacturing technique by different manufacturers. In high level terms, the methods described herein comprise estimating a prior distribution of camera parameters for a family of cameras. This prior distribution may then be used to obtain accurate calibration results for individual cameras of the camera family even where that calibration is carried out online, in an environment which is structure-poor.

Figure 1:
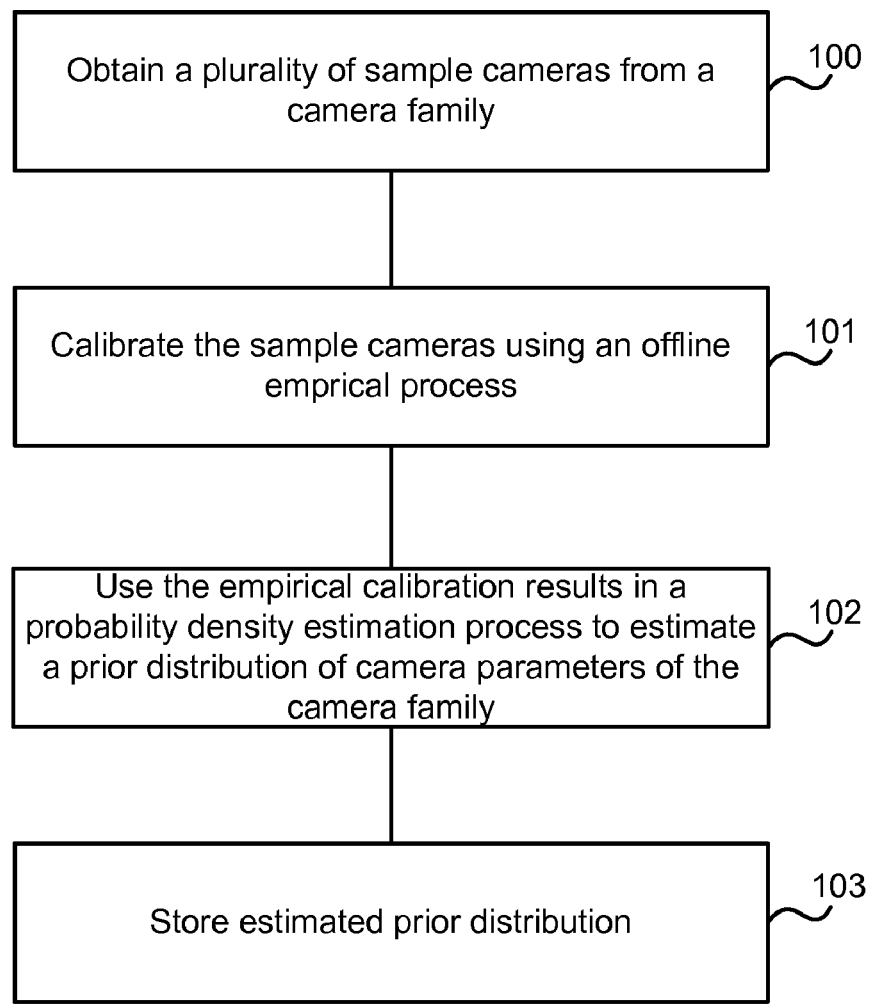
FIG. 1 is a block diagram of an example method of estimating a prior distribution of camera parameters of a family of cameras.

FIG. 1 is block diagram of an example method of estimating a prior distribution of camera parameters for a family of cameras. This is a difficult task because it is not practical to obtain hundreds of cameras from the family and calibrate each of those using an offline, laboratory-based calibration method. In addition, the parameters that it is required to calibrate exist in a relatively high-dimensional space. For example, for stereo cameras a minimal parameterization has seven degrees of freedom. Because of this a large number of sample cameras would need to be calibrated in order to obtain a reliable estimate of the prior distribution for the camera family. However, it is very important to obtain a good estimate or model of the prior distribution for the camera family in order to enable accurate calibration of individual members of the camera family. The methods described herein enable a good estimate of the prior distribution for the camera family to be obtained without the need for calibrating hundreds of cameras from the family in an offline laboratory-based process.

As shown in block 100 of FIG. 1 a plurality of sample cameras are obtained from a camera family. For example, seven sample cameras may be used in the case of a camera family of stereo cameras formed from pairs of mono web-cameras fixed together. Alternatively a few dozen sample cameras may be used. The number of sample cameras required depends on the characteristics of the camera family, such as the number of dimensions of the parameters of the cameras in the family. Depending further on the method used to represent the prior distribution, different numbers of sample cameras can be used, from a minimum of two, with no maximum. The sample cameras are then calibrated (block 101) using an offline process which may require laboratory environment. Any suitable offline camera calibration process may be used to obtain estimates of the camera parameters for each sample camera. Examples of suitable offline camera calibration processes are described in detail in Hartley and Zisserman "Multiple View Geometry in Computer Vision" second edition, 2003, Cambridge University Press, ISBM 0521 54051 8.

Figure 2:
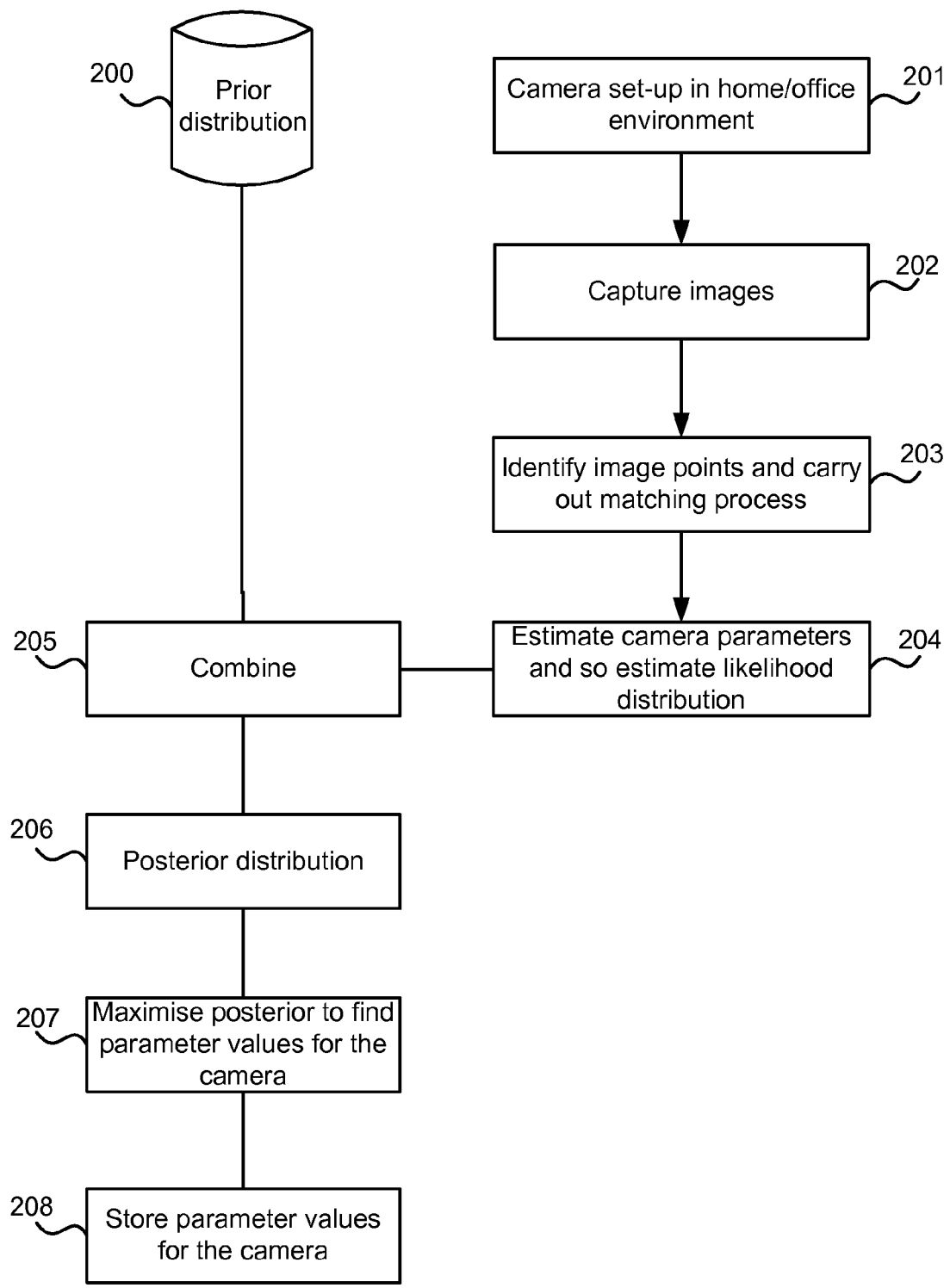
FIG. 2 is a block diagram of an example method of estimating camera parameters of a camera system using a stored prior distribution.

The calibration results for the sample cameras are then used in a probability density estimation process to estimate a prior distribution of camera parameters for the camera family (block 102). Any suitable probability density estimation process may be used. For example, a kernel density estimator is constructed using the sample camera results as described in more detail below. Alternative probability density estimation processes include the fitting of a parametrized model such as a Gaussian or a mixture of Gaussians, in which the forms of the Gaussians may optionally be restricted to have specified special forms of covariance matrices, for example diagonal, scaled identity, block diagonal, etc. The estimated prior distribution is then stored (block 103). In one example, the probability density estimation process comprises fitting a Gaussian with full covariance matrix to the sample camera parameters under a Wishart prior on the covariance. FIG. 2 is a block diagram of an example method of estimating camera parameters of a camera system. A prior distribution for the camera family has already been estimated in an offline process as described above and is stored in an accessible database or other memory (block 200). A camera to be calibrated in an online process, which may be a stereo camera or other camera system depending on the camera family concerned, is set up in a structure-poor environment such as a home or office environment (block 201). The camera is then used to capture one or more images of a structure-poor scene (block 202). For example, if the camera is a stereo camera at least one pair of images forming a stereo pair are captured. In the case of a mono-camera at least two images are captured of a constant scene with the camera in different positions for the two images. A novice user is able to operate the camera in order to capture the images or this may be carried out automatically in a process transparent to the end user.

Image points in the captured images are then identified (block 203) using any suitable process such as a corner detection algorithm, a blob detection algorithm, a line detection algorithm or similar. For example, a Harris edge detector is used as described in "A combined corner and edge detector" Harris and Stephens, Proceedings of The Fourth Alvey Vision Conference, Manchester, pp 147-151. 1988. Taking an image pair, image points that correspond in the two images of the pair are identified (block 203) using any suitable matching process. For example, automatic homography matching as described in Hartley and Zisserman 2003 referenced above, or SIFT matching as described in Lowe "Distinctive image features from scale-invariant keypoints", International Journal of Computer Vision, 60, 2 (2004) pp. 91-110, or by manually indicating corresponding points. The resulting correspondences are then used to estimate the camera parameters (block 204) and so to estimate a likelihood distribution. This distribution over the camera parameters is relatively broad because the images are captured at block (202) in a structure-poor environment in a process carried out by a novice user. Because the images are captured in a structure-poor environment, only a few or perhaps only one point correspondence is identified which gives little information for the calibration process.

The prior distribution is accessed (block 200) and combined (block 205) with the likelihood distribution to produce a posterior distribution (block 206) following Bayes Rule. The posterior distribution is them maximized to find parameter values for the camera being calibrated (block 207) using any suitable maximization process. The parameter values for the camera are stored (block 208).

In this way, information about the camera family is used to improve calibration of a camera from that family even where calibration has been carried out in a structure-poor environment such that perhaps only one point correspondence is obtained during the calibration process.

Figure 3:
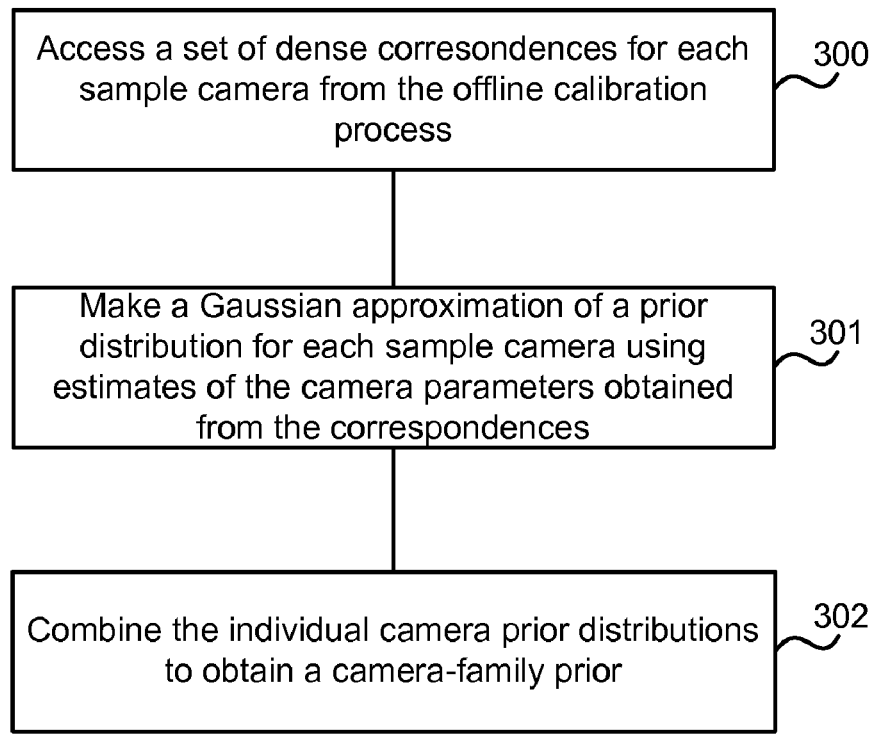
FIG. 3 is a block diagram of another example method of estimating a prior distribution of camera parameters of a family of cameras.

FIG. 3 is a block diagram of another example method of estimating a prior distribution of camera parameters for a family of cameras. As mentioned above, in one example, a kernel density estimator is constructed using the sample cameras. For example, a set of dense point correspondences is accessed for each sample camera from the offline calibration process (block 300). A Gaussian approximation of a prior distribution for each sample camera is made using estimates of the camera parameters obtained from the point correspondences (block 301). The individual camera prior distributions are then combined to obtain a camera-family prior (block 302). In this way a strong estimate of the prior distribution is obtained which may be constructed from only a small number of sample camera results.

Figure 4:
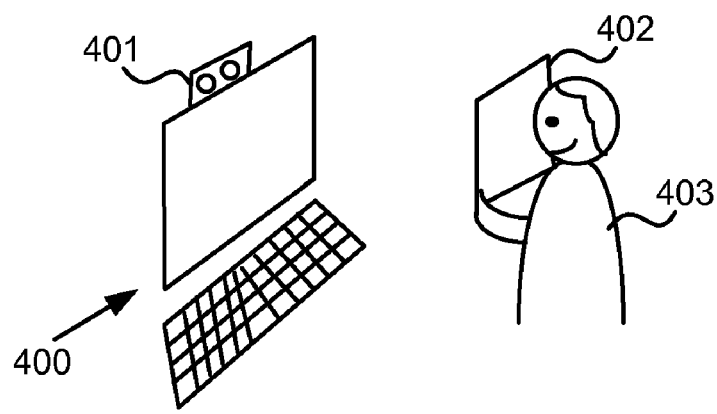
FIG. 4 is a schematic diagram of a stereo camera to be calibrated in a home environment.

During the online camera calibration process it is also possible for the end user to hold a target display in the camera's field of view. Images captured by the camera of this target display may then be used in the online calibration process thus making the process of identifying image points and matching those points more straightforward. For example, FIG. 4 shows a personal computer (PC) 400 with a display monitor having a stereo camera 401 placed on top of the PC monitor. A person 403 holds a target display 402 in the field of view of the camera as shown.

Detailed examples of methods of computing the prior distribution for the camera family and of calibrating a camera from that family are now given. Notation that will be used is first explained.

The term 'camera system' is used herein to refer to one or more cameras arranged together to form an image capture apparatus. The cameras may be conventional cameras, bespoke cameras with special lens arrangements and may comprise stereo rigs and the like.

There is a camera system characterized by parameters θ, which might be, for example, the nine entries of the fundamental matrix of a stereo rig, or perhaps seven parameters describing the focal length and 3D position of a security camera. In the case of a stereo camera rig we choose to use the internal camera parameters for the two cameras comprising the rig, and the rotation and translation between the two.

The available information is a set of N observations $Z=\{z_i\}_{i=1}^N$, where in this work $z_i$ are point correspondences between two images, represented as 4-vectors z=(x, y, x', y'). Associated with each observation is a latent variable $x_i$, which, in the stereo camera case, will be the 3D point which gave rise to the correspondence. Finally there is a projection function $f(θ, x)$ which generates noiseless observations, to which are added noise ν drawn from some robust distribution with density function p(ν) ∝ exp(−ρ(ν)), defined by a robust kernel ρ(•), e.g. the Lorentzian ρ(ν)=log(π(1+∥ν∥²). Thus $$z=f(θ,x)+ν \quad (1)$$

is the observation model.

The goal is to maintain an estimate of θ, and in particular the distribution of θ conditioned on the observations, p(θ|Z). When the parameters are required it is possible to compute the mode of this distribution $\hat{θ}=\text{argmax}_θ p(θ|Z)$ so the distribution need be maintained only up to an overall scale. (Note the symbol Λ is used to indicate an estimator of a parameter. For example $\hat{θ}$ is an estimate of the camera parameters.) By Bayes' rule, p(θ|Z) is expanded to the product of likelihood and prior:

$$p(θ|Z) ∝ p(Z|θ)p(θ), \quad (2)$$

The likelihood p(Z|θ), with the noise assumed independent, and optimizing over the latent variables x is given as:

$$-\log p(Z|θ) = \sum_{i=1}^N \min_x ρ(z_i - f(θ, x)). \quad (3)$$

Online calibration may proceed by capturing a (small) set of point correspondences, $Z_{online}$, and then computing the parameters which maximize the posterior $$\hat{θ}_{online} = \text{argmax}_θ p(Z_{online}|θ) p_F(θ). \quad (4)$$

Note that the prior over θ is now written $p_F$ to indicate that it is a prior over a camera family rather than over all cameras. A standard nonlinear optimizer may be used to perform this maximization, because a good initial estimate may be provided.

As mentioned above, the parameters to be calibrated live in a relatively high-dimensional space. For stereo cameras, it is required to calibrate the fundamental matrix between the two image planes: a minimal parameterization has seven degrees of freedom, so $θ ∈ \mathfrak{R}^7$. To fit a single Gaussian with full covariance to the samples requires a minimum of eight sample cameras, but in practice many times this number would be needed in order to obtain a reliable estimate.

Furthermore, the distribution of parameters in such minimal parameterizations are often strongly nonlinear and poorly fit by a single Gaussian. This is mitigated by using a higher dimensional overparameterization as described below, in which space the Gaussian model is likely to prove a better fit.

In an example a kernel density estimator is formed using the sample cameras. Given M cameras, for each camera a large, space-filling set of correspondences $Z_m = \{z_{mi}\}_{i=1}^{N_m}$ is obtained. A Gaussian approximation of $p(θ|Z_m)$ is made by finding the mode $\hat{θ}_m$ and taking the second-order expansion of $p(θ|Z_m)$ around the mode:

$$\hat{θ}_m = \text{argmax}_θ p(Z_m|θ)p(θ) \quad (5)$$

$$p(θ|Z_m) ≈ N(θ|\hat{θ}_m, \hat{Σ}_m) \quad (6)$$

The global camera prior p(θ) is a broad Gaussian with parameters as discussed below, and $\hat{Σ}_m$ is the covariance matrix, computed as below.

The camera-family prior $p_F(θ)$ is then obtained by combining these distributions over θ. The prior may be approximated by a Gaussian, having chosen a parameterization (see below) which makes this a good approximation. The prior parameters will be written $\bar{θ}$ and Σ, giving $$p_F(θ) = N(θ|\bar{θ}, Σ) \quad (7)$$

Various approximations may be used for computation of $\bar{θ}$ and Σ. An example approximation is to assume that the datasets were independent draws from the camera family so that $$p_F(θ) = \prod_{m=1}^M p(θ|Z_m)^η. \quad (8)$$

Where η is a tuning factor which can be empirically set.

As described above, two stages are specified: the first dealing with offline calibration and the construction of $p_F$; the second describing the online process. In both stages, a common tool is the optimization of the posterior (2) under a Gaussian prior, which will be denoted generically by the negative log posterior function $ε(θ;Z,μ,Σ)$, defined by $$ε(θ; Z, μ, Σ) = \sum_{i=1}^N \min_x ρ(z_i - f(θ, x)) + (θ - μ)^T Σ^{-1} (θ - μ) \quad (10)$$

where additive constants independent of θ have been omitted.

A particular example with reference to a family of stereo cameras is now given.

Parameterization

Five intrinsic parameters may be used for each camera: focal lengths along x and y directions ($f_x$ and $f_y$), principal point ($p_x$ and $p_y$) and skew s. The motion between the two cameras in a stereo rig is given by 3 rotational and 2 translational parameters. The rotation is represented by a three-parameter Rodrigues vector ω, with which is typically associated a base rotation matrix $R_0$ as described in B. Triggs, P. McLauchlan, R. Hartley, and A. Fitzgibbon "Bundle adjustment—a modern synthesis" Vision algorithms: Theory and practice, Springer-Verlag LNCS 1883, 2000. Let function rod ($\omega$) denote the 3×3 matrix representation of the rotation defined by $\omega$. Translation is modelled as two rotations about fixed axes $a_1$, $a_2$ perpendicular to a base translation $t_0$, giving $t(\alpha_1, \alpha_2) = \text{rod}(\alpha_1 a_1)\text{rod}(\alpha_2 a_2)t_0$. Three-dimensional points x are parameterized by homogeneous 4-vectors, with the gauge-fixing constraint that $\|x\|=1$. Thus the 15-element parameter vector is $$\theta = \left[f_x, \frac{f_x}{f_y}, s, p_x, p_y, f'_x, \frac{f'_x}{f'_y}, s', p'_x, p'_y, \omega_1, \omega_2, \omega_3, \alpha_1, \alpha_2\right]^T \quad (11)$$

where primed quantities are in the second camera. The benefit of this parameterization is that we can use a single Gaussian to model the prior over $\theta$.

Given this parameterization, the observation function $f$ may be defined. Recall that $f$ takes parameters $\theta$, a 3D point x and generates a single correspondence (x, y, x', y'), which is defined by $$\begin{pmatrix} x \\ y \\ 1 \end{pmatrix} \sim \begin{pmatrix} f_x & sf_x & p_x \\ 0 & f_y & p_y \\ 0 & 0 & 1 \end{pmatrix} [I|0]x \quad (12)$$

$$\begin{pmatrix} x' \\ y' \\ 1 \end{pmatrix} \sim \begin{pmatrix} f'_x & s'f'_x & p'_x \\ 0 & f'_y & p'_y \\ 0 & 0 & 1 \end{pmatrix} [\text{rod}(\omega)R_0|t(\alpha_1, \alpha_2)]x$$

where ~ denotes equality up to scale.

Offline Calibration

In the offline calibration of the $m^{th}$ stereo camera, dense correspondences are obtained by moving a large planar textured target relative to the camera. This typically gives rise to several hundred point correspondences, denoted $Z_m$, from which initial estimates of $\theta$ are obtained using RANSAC and self-calibration as described in R. Hartley and A. Zisserman "Multiple View Geometry in Computer Vision", Cambridge University Press, 2000. These are refined by nonlinear optimization of (10), viz:

$$\theta_m = \text{argmin } \epsilon(\theta; Z_m, \mu, \Sigma) \quad (13)$$

under a broad global prior, where, for example, $\mu=(800, 1, 0, 320, 240, 800, 1, 0, 320, 240, 0, 0, 0, 0, 0)$; $\Sigma=\text{diag}(300, 0.005, 10^{-4}, 25, 25, 300, 0.005, 10^{-4}, 25, 25, \infty, \infty, \infty, 1, 1)^2$. These are expressed in pixel coordinates, but all calculations are scaled so as to work in conditioned coordinates. The Gaussian approximation of the $m^{th}$ camera posterior $p(\theta|Z_m)$ is then given [C. Bishop "Pattern recognition and machine learning", Springer, 2006, p214ff] by $\mu_m = \theta_m$, and $\Sigma_m = H^{-1}$ where H is the Hessian of $\epsilon$, with $ij^{th}$ entry $$H_{ij} = \frac{\partial}{\partial \theta_j} \frac{\partial \epsilon}{\partial \theta_j} \quad (14)$$

Because the Hessian is not necessarily positive definite after numerical minimization, all negative eigenvalues are replaced with zero; and when inverting, the pseudoinverse is used.

Computing the Prior

Combining the per-camera posteriors using (8) then gives the following expression for a Gaussian prior over the camera family.

$$\bar{\theta} = \frac{1}{M}\sum_{m=1}^{M} \theta_m \quad (15)$$

$$\Sigma = \left(\eta \sum_{m=1}^{M} \sum_m^{-1}\right) \quad (16)$$

For example, $\eta$ may be set to 0.1 or any other available value.

It is also possible to truncate $\Sigma$ to low rank before use in the prior.

Online Calibration

Given the parameters of the prior, online estimation is a matter of optimizing the error function (10) with the prior just described. In the extreme case of a single point correspondence $Z=\{z_1\}$ corrupted by Gaussian noise, the estimate is given by $$\bar{\theta} = \underset{\theta}{\text{argmin}} \varepsilon(\theta; \{z_1\}, \bar{\theta}, \Sigma) \quad (17)$$

$$= \underset{\theta}{\text{argmin}} \left[\underset{x}{\min}\|z_1 - f(\theta, x)\|^2 + (\theta - \bar{\theta})^T \Sigma^{-1}(\theta - \bar{\theta})\right] \quad (18)$$

This may be implemented using MATLAB's optimization routine fminunc on the equivalent problem $$\underset{\theta, x}{\min}\|z_1 - f(\theta, x)\|^2 + (\theta - \bar{\theta})^T \Sigma^{-1}(\theta - \bar{\theta}), \quad (19)$$

with $\bar{\theta}$ as initial estimate, and initial estimate of x obtained using optimal triangulation of the correspondences. Optimal triangulation is described in Hartley and Zisserman referenced above.

Exemplary Computing-Based Device

Figure 5:
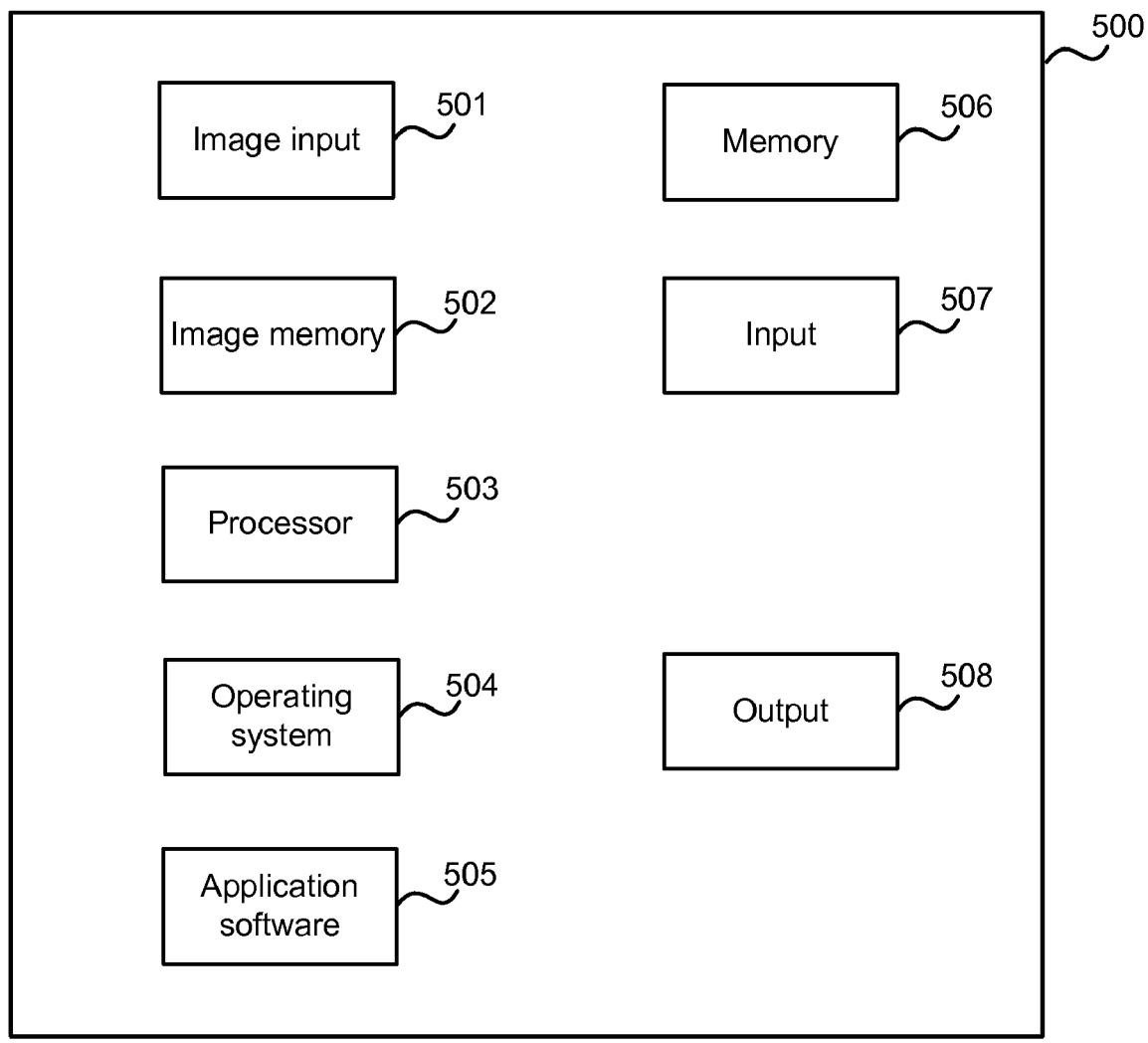
FIG. 5 illustrates an exemplary computing-based device in which embodiments of a camera calibration system may be implemented.

FIG. 5 illustrates various components of an exemplary computing-based device 500 which may be implemented as any form of a computing and/or electronic device, and in which embodiments of a camera calibration system may be implemented.

The computing-based device 500 may be integral with a camera or may be independent and arranged to receive images captured by a camera. It comprises an input 501 which is of any suitable type for receiving images and optionally other inputs 507 for receiving input of any suitable type including information about a prior distribution for a camera family.

Computing-based device 500 also comprises one or more processors 503 which may be microprocessors, controllers or any other suitable type of processors for processing computing executable instructions to control the operation of the device in order to calibrate a camera of a camera family. Platform software comprising an operating system 504 or any other suitable platform software may be provided at the computing-based device to enable application software 505 to be executed on the device.

The computer executable instructions may be provided using any computer-readable media, such as memory 506. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output 508 is also provided such as an audio and/or video output to a display system integral with or in communication with the computing-based device. The display system may provide a graphical user interface, or other user interface of any suitable type although this is not essential. The output 508 may also provide camera parameters obtained by the camera calibration process to an image processing system or other system arranged to use images captured by the camera.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate. Additionally, individual blocks may be deleted from any of the methods without departing from the spirit and scope of the subject matter described herein.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method for camera calibration, the method comprising:
   obtaining a set of camera parameters for each of a plurality of sample cameras, those sample cameras being members of a family of cameras where all cameras of the family are manufactured at least partially in a common manner;
   carrying out a probability density estimation process to estimate a prior distribution of camera parameters for the camera family using the camera parameters of the sample cameras, wherein the probability density estimation process comprises estimating the prior distribution for each sample camera and combining each prior distribution for each sample camera to obtain the prior distribution of camera parameters for the camera family; and
   storing the estimated prior distribution.

2. A computer-implemented method for camera calibration, the method comprising:
   receiving at least two images of a scene captured at a camera to be calibrated, that camera being a member of a specified family of cameras where all members of the family of cameras are manufactured at least partly in a common manner;
   forming an initial estimate of parameters of the camera;
   accessing a prior distribution of camera parameters for the specified camera family, that prior distribution having been estimated by obtaining camera parameters for a plurality of sample cameras from the camera family and carrying out a probability density estimation process using the camera parameters of the sample cameras;
   combining the initial estimate of the parameters of the camera with information from the received images, and the accessed prior distribution to obtain a posterior distribution;
   maximizing the posterior distribution to find improved parameter values for the camera; and
   storing the improved parameter values.

3. A method as claimed in claim 2 which comprises extracting information from the received images by identifying image points in the images and finding at least one correspondence between an image point in one of the images and an image point in another of the images.

4. A method as claimed in claim 2 which comprises extracting information from the received images by identifying image points in the images and finding only one correspondence between an image point in one of the images and an image point in another of the images.

5. A method as claimed in claim 2 wherein the probability density estimation process comprises forming a kernel density estimator.

6. A method as claimed in claim 2 wherein the probability density estimation process comprises fitting a Gaussian with full covariance matrix to the camera parameters of the sample cameras under a Wishart prior on the covariance.

7. A method as claimed in claim 2 wherein the probability density estimation process comprises estimating a prior distribution for each sample camera and combining those to obtain the prior distribution of camera parameters for the camera family.

8. A method as claimed in claim 2 wherein the camera is a stereo camera comprising two cameras and wherein 15 camera parameters are used.

9. A method as claimed in claim 2 wherein the images are of a structure-poor scene.

10. A method as claimed in claim 2 wherein the step of combining the initial estimate of the camera parameters with information about the accessed prior distribution comprises using Bayesian techniques.

11. A camera calibration system comprising:
an input arranged to receive at least two images of a scene captured at a camera to be calibrated, that camera being a member of a specified family of cameras where all members of the family of cameras are manufactured at least partly in a common manner;
a processor arranged to form an initial estimate of parameters of the camera;
a memory arranged to store a prior distribution of camera parameters for the specified camera family, that prior distribution having been estimated by obtaining camera parameters for a plurality of sample cameras from the camera family and carrying out a probability density estimation process using the camera parameters of the sample cameras;
the processor also being arranged to combine the initial estimate of the parameters of the camera with information from the received images and the stored prior distribution to obtain a posterior distribution;
the processor also being arranged to maximize the posterior distribution to find improved parameter values for the camera; and
a memory arranged to store the improved parameter values.

12. A camera calibration system as claimed in claim 11 wherein the processor is arranged to extract information from the received images by identifying image points in the images and finding at least one correspondence between an image point in one of the images and an image point in another of the images.

13. A camera calibration system as claimed in claim 11 wherein the processor is arranged to extract information from the received images by finding only one correspondence between an image point in one of the images and an image point in another of the images.

14. A camera calibration system as claimed in claim 11 wherein the processor is further arranged to estimate the prior distribution.

15. A camera calibration system as claimed in claim 11 for calibrating a stereo camera comprising two cameras and wherein the processor is arranged to use 15 camera parameters.

16. A camera calibration system as claimed in claim 11 wherein the input is arranged to receive images of a structure-poor scene.

17. A camera calibration system as claimed in claim 11 wherein the processor is arranged to combine the initial estimate of the camera parameters with information about the prior distribution using Bayesian techniques.

* * * * *